United States Patent [19]

Greskovich et al.

[11] 4,093,687

[45] June 6, 1978

[54] HOT PRESSING OF SILICON NITRIDE USING MAGNESIUM SILICIDE

[75] Inventors: Charles D. Greskovich, Schenectady; Chester R. O'Clair, Latham, both of N.Y.

[73] Assignee: General Electric Company, Schenectady, N.Y.

[21] Appl. No.: 756,083

[22] Filed: Jan. 3, 1977

[51] Int. Cl.² .................... C04B 35/58; C04B 35/64
[52] U.S. Cl. ........................ 264/65; 106/55; 106/73.5
[58] Field of Search .............. 264/65; 106/73.5, 55; 423/344

[56] References Cited

U.S. PATENT DOCUMENTS

| | | | |
|---|---|---|---|
| 3,821,005 | 6/1974 | Layden | 106/73.5 |
| 3,830,652 | 8/1974 | Gazza | 106/73.5 |
| 3,835,211 | 9/1974 | Coe et al. | 264/66 |
| 3,836,374 | 9/1974 | Richerson et al. | 106/73.5 |
| 3,854,189 | 12/1974 | Ezis et al. | 423/344 |

*Primary Examiner*—Winston A. Douglas
*Assistant Examiner*—Mark Bell
*Attorney, Agent, or Firm*—J. M. Binkowski; J. T. Cohen; M. Snyder

[57] ABSTRACT

A dense polycrystalline silicon nitride body is produced by hot-pressing a particulate mixture of silicon nitride and a magnesium silicide additive.

4 Claims, 1 Drawing Figure

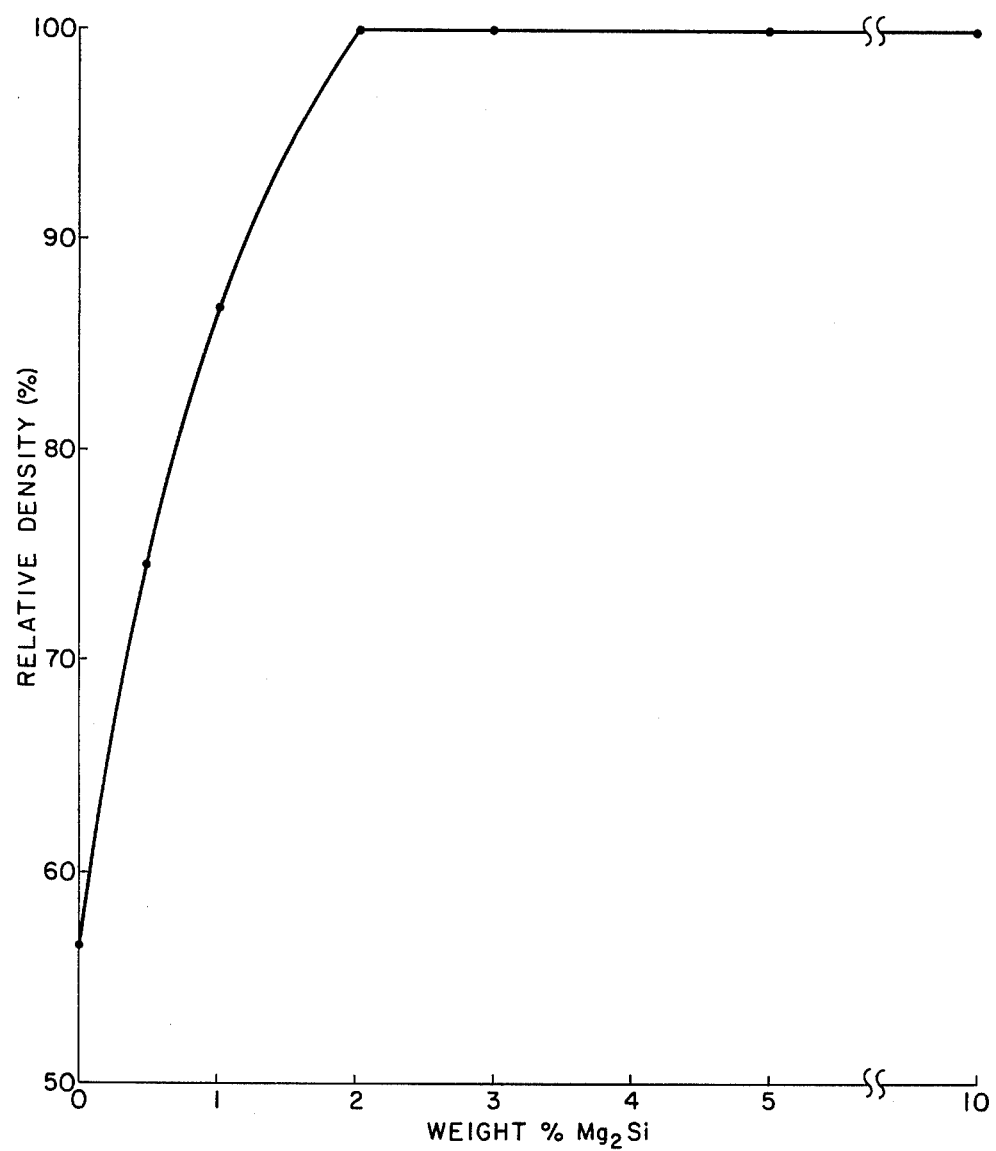

HOT PRESSING OF SILICON NITRIDE USING MAGNESIUM SILICIDE

The invention herein described was made in the course of or under a contract or subcontract thereunder (or grant) with the Department of the Air Force.

Silicon nitride is a choice candidate material for turbine applications because of its good high temperature strength and creep resistance, low thermal expansion coefficient and excellent oxidation resistance. So far, the conventional method of producing large specimens of dense silicon nitride is by hot-pressing with the help of an oxide flux, at temperatures greater than 1700° C. Various oxide fluxes or densification aids, such as MgO, $Y_2O_3$, $ZrO_2$ and $Ce_2O_3$, permit the attainment of full density in hot-pressed $Si_3N_4$. However, experience has shown that these oxide additions produce a silicate glass at grain boundaries which has a deleterious effect on the high temperature creep and strength properties due to the softening or melting of the glassy phase at temperatures ranging from about 1000° C to 1200° C depending on the oxide flux added. Consequently, most efforts to improve the high temperature properties of $Si_3N_4$ containing an oxide additive(s) have been directed towards improving the refractoriness of the silicate "glassy" phase by composition control and crystallization methods.

In accordance with the present process no oxide additive is used. Also, at the grain boundaries of the present product there appears to be no detectable glassy phase.

The present invention is directed to hot-pressing a homogeneous particulate dispersion of silicon nitride and magnesium silicide to produce a novel dense polycrystalline body of silicon nitride which substantially retains its room temperature mechanical properties at elevated temperatures ranging up to about 1350° C or higher in air, depending on the purity of the starting powder.

Those skilled in the art will gain a further and better understanding of the present invention from the detailed description set forth below, considered in conjunction with the FIGURE, accompanying and forming a part of the specification, which is a graph showing relative densities of silicon nitride hot-pressed with magnesium silicide additions at 1750° C for 20 minutes under a pressure of 8000 psi. The amount of $Mg_2Si$ is based on the amount of silicon nitride. Specifically, the graph is a plot of the relative density of the hot-pressed silicon nitride body, i.e. the fractional density of the theoretical density of silicon nitride (3.18 g/cc) vs. the amount of $Mg_2Si$ admixed with the starting silicon nitride powder. The graph illustrates the present invention and shows the highly dense bodies of silicon nitride which can be produced particularly with additions of about 2% by weight of $Mg_2Si$.

Briefly stated, the process of the present invention comprises providing at least a significantly homogeneous particulate dispersion or mixture having an average particle size which is submicron of silicon nitride and magnesium silicide in an amount of about 0.5% by weight to about 3.0% by weight based on the amount of said silicon nitride, and hot-pressing said particulate dispersion in an atmosphere of nitrogen at a temperature ranging from about 1600° C to about 1850° C under a minimum pressure of about 2000 psi to produce a pressed body having a density of at least 80% of the theoretical density for silicon nitride.

The silicon nitride powder used in the present process may be amorphous or of the $\alpha$-type or mixtures thereof. These powders can also contain $\beta$-silicon nitride usually in an amount up to about 20 weight % of the total amount of silicon nitride.

At present commercially available silicon nitride powder in any significant amount is formed by nitridation of silicon powder with the aid of catalysts which always leave CaO, $Fe_2O_3$, and $Al_2O_3$ as impurities, in a significant amount, typically about 1 to 2%. Such a silicon nitride powder is not useful in the present process because when it is hot-pressed, even without an oxide flux, these impurities combine with $SiO_2$, which is inherently initially present in silicon nitride or forms on firing, to produce a low melting intergranular glassy phase.

In contrast, the present starting silicon nitride powder is substantially pure but it can range somewhat in purity. The necessary purity of the powder used depends largely on the temperatures and loads at which the final hot-pressed product will be used with the highest temperatures of use generally requiring the most pure powders. Specifically, with increasingly pure powder the resulting hot-pressed product increasingly retains its room temperature properties at high temperatures, i.e. the more stable are the mechanical properties of the hot-pressed product with increasing temperature.

The present silicon nitride powder may contain certain metallic and non-metallic impurities in a limited amount and these impurities are based on the total composition of the starting silicon nitride powder. Specifically, the powder should be free or substantially free of metallic impurities which react with $SiO_2$ or Si and $O_2$ to form low melting intergranular silicate glassy phase in a significant amount. Those impurities which form such a glassy phase include calcium, iron and aluminum and should not be present in a total amount greater than about 0.1% by weight. Also, the present silicon nitride powder may have an oxygen content ranging up to about 3% by weight. Normally, the oxygen is present in the form of silica. The amount of excess elemental silicon in the powder should not be present in an amount higher than about 4% by weight because appreciable amounts of residual elemental silicon may be retained in the product, depending on the extent of nitridation occurring during hot-pressing. Also, any elemental silicon present should be of submicron size and should be substantially homogeneously dispersed throughout the powder. Non-oxide impurities such as halogens which evaporate to a significant extent and which do not significantly deteriorate the properties of the hot-pressed silicon nitride body may also possibly be present in amounts up to about 1% by weight of the starting silicon nitride powder.

To produce a hot-pressed product which has substantially stable mechanical properties at high temperatures, the preferred starting silicon nitride powder has a low oxygen content, i.e. usually about 2% or less by weight of the powder, and essentially free of elemental silicon. Also, it is free or substantially free of metallic impurities in total amount ranging up to about 0.05% by weight of the powder. Such a powder can be synthesized. Alternatively, to reduce its oxygen content and also remove its vaporizable impurities, the silicon nitride powder can be calcined at a temperature ranging from about 1300° to about 1500° C in a vacuum or in an atmosphere which has no significant deteriorating affect on the powder such as helium, nitrogen, hydrogan and mixtures thereof.

The present silicon nitride powder can be produced by a number of processes. For example, in one process $SiO_2$ is reduced with carbon in nitrogen below 1400° C. Still other processes react a silicon halide with ammonia or a nitrogen and hydrogen mixture to obtain either $Si_3N_4$ directly or via precursors such as $Si(NH)_2$ which are converted to $Si_3N_4$ by calcination yielding silicon nitride which usually contains oxygen and halogens at a 1% to 3% by weight level. The powder can also be synthesized in a plasma from silicon vapor and nitrogen.

Very pure silicon nitride powder can be formed by a process set forth in Ser. No. 756241 filed of even date herewith in the names of Svante Prochazka and Charles D. Greskovich and assigned to the assignee hereof and which by reference is incorporated herein. Specifically, this copending application discloses reacting silane and an excess amount of ammonia above 500° C and calcining the resulting solid at between 1100° to 1500° C to obtain amorphous or crystalline silicon nitride.

In the present process magnesium silicide, $Mg_2Si$, is used as a densifying agent. In contrast to magnesium nitride which is highly hygroscopic at room temperature which requires it to be used under nitrogen glove box conditions, magnesium silicide is a friable solid which is stable in air at room temperature and therefore presents no problems with respect to formulation and mixing procedures thereby permitting a significantly simpler and much more practical preparation process. In the present process magnesium silicide is used in an amount ranging from about 0.5% by weight to about 3.0% by weight of the silicon nitride. The preferred amount of magnesium silicide is determinable empirically and it is the lowest amount necessary to produce the hot-pressed body of desired density under the particular hot-pressing conditions used in the present process. However, amounts of magnesium silicide less than about 0.5% are not effective in producing the present hot-pressed body with a density with at least about 80%. On the other hand, amounts of magnesium silicide higher than about 3.0% by weight of the silicon nitride provide no additional densification of the hot-pressed body.

In carrying out the present process at least a significantly or substantially uniform or homogeneous particulate dispersion or mixture having an average particle size which is submicron of silicon nitride and the magnesium silicide is formed. Such a dispersion is necessary to produce a hot-pressed product with significantly uniform properties and having a density of at least 80%. The silicon nitride and magnesium silicide powders, themselves, may be of a particle size which breaks down to the desired size in forming the dispersion but preferably the starting silicon nitride is submicron and the starting magnesium silicide is less than 5 microns in particle size, and preferably, submicron. Generally, the silicon nitride powder ranges in mean surface area from about 2 square meters per gram to about 50 square meters per gram which is equivalent to about 0.94 micron to 0.04 micron, respectively. Preferably, the silicon nitride powder ranges in mean surface area from about 5 square meters per gram to about 25 square meters per gram which is equivalent to about 0.38 micron to about 0.08 micron, respectively.

The silicon nitride and magnesium silicide powders can be admixed by a number of techniques such as, for example, ball milling or vibratory milling, to produce a homogeneous dispersion. The more uniform the dispersion, the more uniform are the microstructure and properties of the resulting dense hot-pressed body.

Representative of these mixing techniques is ball milling, preferably with balls of a material such as tungsten carbide or silicon nitride which has low wear and which has no significant detrimental effect on the properties desired in the final product. If desired, such milling can also be used to reduce particle size, and to distribute any impurities which may be present substantially uniformly throughout the powder. Preferably, milling is carried out in a liquid mixing medium which is inert to the ingredients. Typical liquid mixing mediums include hydrocarbons such as benzene and chlorinated hydrocarbons. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven maintained just above the boiling point of the liquid mixing medium.

The present powder dispersion is hot-pressed in an atmosphere of nitrogen which can range from atmospheric pressure to superatmospheric pressure, generally, up to about 5 atmospheres. The nitrogen inhibits or prevents significant thermal decomposition of the silicon nitride and thereby promotes its densification. In the present invention no significant weight loss due to the thermal decomposition of silicon nitride occurs. Gases such as argon or helium are not useful at the lower pressing temperatures, i.e. below about 1750° C because they are too expensive for commercial use, and at temperatures close to or above 1750° C they would not prevent thermal decomposition of silicon nitride.

Thermal decomposition of silicon nitride may possibly occur during the hot-pressing cycle to leave elemental silicon in the product. By a significant thermal decomposition of the silicon nitride herein it is meant a decomposition which produces elemental silicon in the hot-pressed product in an amount higher than about 2% by volume of the product. This can be monitored by microstructural observation of polished sections of the hot-pressed body.

The nitrogen gas used should be free of oxygen or substantially free of oxygen so that there is no significant oxygen pickup by the body being hot-pressed.

In carrying out the present process, the particulate mixture or dispersion is hot-pressed, i.e. densified, at a pressure and temperature and for a sufficient period of time to produce the present dense product. Specifically, the hot-pressing temperature ranges from about 1600° C to about 1850° C and applied pressure at such pressing temperature ranges from about 2000 psi to a maximum pressure which is limited by available pressing equipment. Thus, for solid graphite dies the upper limit is about 5000 psi and for graphite fiber-wound dies the upper limit is about 15,000 psi. The specific temperature and pressure used is determinable empirically and depends largely on the powder being pressed and the specific dense product desired. The higher the pressure, the lower is the pressing temperature required, but as a practical matter, temperatures below 1600° C will not produce the present dense product. On the other hand, temperatures higher than about 1850° C are not practical since the silicon nitride decomposes substantially in the present hot-pressing process at about 1900° C resulting in material loss. Preferably, for best results, the hot-pressing or densification temperature ranges from about 1700° C to about 1830° C and the pressure ranges from about 5000 psi to about 10,000 psi. It is advantageous to use a pressure close to the maximum available because the application of such high pressure makes it possible to keep the pressing temperature low enough to control grain growth. Generally, hot-pressing in the present process is carried out at the desired temperature in a period of time ranging up to about 30 minutes, and longer periods of time usually do not provide any significant advantage except at temperatures below 1700° C where there continues to be a conversion of $\alpha$- to the preferred $\beta$-form of silicon nitride.

The composition of the silicon nitride in the present product depends on the hot-pressing temperatures used and ranges from $\alpha$-silicon nitride alone to $\beta$-silicon nitride alone with all mixtures of the $\alpha$- and $\beta$-forms of silicon nitride falling within the range. Specifically, with hot-pressing temperatures below about 1680° C, the silicon nitride in the resulting hot-pressed product may be all of the $\alpha$-form, or it may be comprised of a major amount of the $\alpha$-form and up to about 25% by weight of the $\beta$-form, based on the total amount of silicon nitride depending on the amount of $\alpha$- which converts to the $\beta$-form, and also on the amount of the $\beta$-form initially present in the powder. At temperatures above about 1680° C and ranging up to about 1750° C, the silicon nitride in the resulting product is always a mixture of $\alpha$- and $\beta$-forms of silicon nitride. At hot-pressing temperatures above about 1750° C, the silicon nitride in the product is usually only of the $\beta$-type.

The morphology of the $\alpha$- and $\beta$-silicon nitrides in the hot-pressed product is distinguishable. Specifically, as determined by scanning electron microscopy and metallographically in combination with X-ray diffraction analysis, the grains of $\alpha$-silicon nitride are substantially equiaxed in form whereas the $\beta$-silicon nitride grains are elongated in form. The $\alpha$-grains are always less than two microns in size and normally less than one micron in size. Preferably, they have a grain size of one micron or less. The $\beta$-grains are generally less than about 5 microns in length, and for best results usually less than about 2 microns in length and have a width usually less than about 0.5 micron. The strength of the present hot-pressed product increases with increasing content of $\beta$-silicon nitride provided that such grains are less than about 10 microns in length. The $\beta$-grains are interpenetrating usually forming a network which resists fracture. At relatively high hot-pressing temperatures and for relatively long periods of hot-pressing, i.e. longer than about one hour, the $\beta$-grains may grow to a length of about 10 microns. Preferably, the present product is comprised of only the $\beta$-form of silicon nitride since it provides the most stable properties.

The hot-pressed body of the present invention has a density ranging from about 80%, and preferably from about 96% to about 100% of the theoretical density of silicon nitride. The product is comprised of silicon nitride and some form of magnesium. The magnesium is present in an amount ranging from about 0.3% by weight to about 1.9% by weight of the silicon nitride. The magnesium component of the product is detectable or determinable by techniques such as X-ray fluorescent analysis, emission spectroscopy and chemical analysis.

The present hot-pressed product may also contain oxygen in some form in an amount up to about 3% by weight of the product. Preferably, for high temperature applications, the hot-pressed product contains oxygen in an amount less than about 2% by weight of the product. Oxygen content may be determined by techniques such as neutron activation analysis.

According to X-ray diffraction analysis or optical microscopy, the hot-pressed product may be single phase or polyphase. With reference to the hot-pressed product of the present invention by the term single phase or primary phase it is meant herein the silicon nitride phase, i.e. the $\alpha$-form or $\beta$-form of silicon nitride and mixtures thereof. The single phase hot-pressed body indicates dissolution of the magnesium therein. Generally, when the magnesium silicide additive is used in amounts of up to about 1% by weight of the silicon nitride, it is difficult to detect a secondary phase in the hot-pressed product and it is believed to be a single phase material. However, when the magnesium silicide is used in amounts of about 2% to 3% by weight of the silicon nitride a secondary magnesium containing phase may be detected, and it is believed to be some form of magnesium silicon nitride. This secondary phase may be present in an amount less than about 5% by volume of the hot-pressed body.

In an alternative embodiment of the present invention, free carbon, submicron in size, is admixed with the present silicon nitride and magnesium silicide dispersion to form at least a significantly or substantially homogeneous dispersion. Mixing can be carried out by the same techniques used in forming the silicon nitride and magnesium silicide dispersion. The amount of free or elemental carbon ranges from about 0.5% by weight to about 4% by weight, and preferably from about 1% by weight to about 2% by weight, based on the amount of silicon nitride. The particular amount of free carbon used is determinable empirically but should be sufficient so as to leave no free carbon or no significant amount of free carbon in the hot-pressed product. The free carbon addition provides a number of advantages. It reacts with surface oxide films which may be present on the silicon nitride powder and also with oxygen present in the hot-pressing environment thereby substantially reducing the amount of oxygen in the final hot-pressed product. The free carbon also reacts in the system to produce in situ very fine-sized pure silicon carbide particles less than about 2 microns in size. The presence of these fine silicon carbide particles in the silicon nitride matrix leads to improved strength and fracture toughness because the thermal expansion coefficient of silicon carbide is larger than that of silicon nitride and hence the silicon nitride matrix surrounding the particles will be in a state of compression, thereby enhancing the fracture energy as well as the high temperature strength of the resulting hot-pressed product. In this embodiment of the invention, the hot-pressed product contains discrete and isolated particles of silicon carbide distributed substantially uniformly throughout the hot-pressed body in an amount ranging from about 1% to about 8% by volume of the body. Amounts of free carbon which result in the formation of silicon carbide in amounts higher than about 8% by volume of the hot-pressed body are not useful because the larger volume of silicon carbide particles would result in these particles being insufficiently isolated to provide the desired state of compression.

In addition, if the starting powder contains free silicon, the hot-pressed body may also contain free silicon as a secondary phase, but such free silicon should be present in an amount less than about 2% by volume of the hot-pressed body.

The secondary phase or phases are discrete and distributed substantially uniformly throughout the present hot-pressed body. Generally, the grains of the secondary phase or phases are of about the same size or finer than the grains of the primary phase.

The presence of a glassy phase is usually determined by selective etching of the specimen and observing the pits formed by the the etched out glassy phase and/or by deep etching of the grain boundaries themselves. Sectioning and polishing of the present hot-pressed body and subjecting the polished surface to acid solutions containing hydrofluoric acid reveals no etching or no significant etching of the grain boundaries which signifies essentially no detectable evidence of an intergranular silicate phase at the grain boundaries.

The present hot-pressed product usually exhibits a preferred orientation of the grains in a direction perpendicular to the direction of the applied hot-pressing pressure, i.e. a preferred orientation in the plane perpendicular to the hot-pressing direction. As a result, a test bar cut perpendicular to the hot-pressing direction usually exhibits a tensile strength higher than that of a test bar cut parallel to the plane of the hot-pressing direction.

The present hot-pressed product is useful in structural applications such as components for gas turbines. Specifically, the present process can produce hot-pressed products in the form of simple shapes including cylinders, plates and domes which retain their room temperature shape and mechanical properties at high temperatures making these bodies particularly useful for high temperature structural applications.

In the present invention, unless otherwise stated, the density of the hot-pressed body is given as a fractional density of the theoretical density of silicon nitride (3.18 g/cc).

The invention is further illustrated by the following examples wherein the procedure was as follows unless otherwise stated:

In-house silicon nitride powder was prepared for use in all the examples as disclosed in copending Serial No. 756,241 filed of even date herewith. Specifically, this powder was prepared in a furnace which included an open-ended fused silica reaction tube 3.8 cm. diameter placed in a tube furnace, i.e. except for its open-end portions the reaction tube was located inside the furnace, and connected on the downstream end to a coaxial electrostatic separator operated between 5 and 15 KV and 0.2 to 0.5 mA. The outlet of the separator was terminated with a bubbler filled with an organic solvent which ensured positive pressure in the system. A liquid manometer indicated gas pressure in the reaction tube. For each run the reaction tube was heated at a length of 15 inches to a maximum temperature which was 600° C for the silicon nitride powder used in Example 1 and which was 850° C for the powder used in Examples 2 and 3, the system purged with purified argon and the reactants were then metered in. Electronic grade silane and anhydrous ammonia dried further by passing the gas through a column of calcium nitride were metered in separately by coaxial inlets into the reaction tube. The gas flow rates were adjusted to 0.2 standard cubic feet per hour (SCFPH) of $SiH_4$ and 3.5 SCFPH of $NH_3$. A voluminous, light-tan powder was collected in the downstream end of the reaction tube and in the attached electrostatic separator. After four hours the gas flow of reactants was discontinued and the system was left to cool off to room temperature under a flow of 0.5 SCFPH of purified argon, and the powder was then recovered from the reactor and separator. The product was a light-tan powder, amorphous to X-rays, had wide absorption bands in its I.R. spectra centered around 10.5 and 21.0 microns (characteristic for silicon-nitrogen bonding), and contained no metals above 50 ppm determined by emission spectroscopy.

Surface area measurements were made by a low temperature nitrogen absorption technique.

Oxygen content was determined by neutron activation analysis.

Powder density was determined by a helium Null-Pycnometer.

Before each hot-pressing run the system was evacuated and back-filled with nitrogen gas and during the hot-pressing run and subsequent furnace cooling nitrogen was flowing through the system at a flow rate of one cubic foot per hour.

EXAMPLE 1

The in-house silicon nitride powder used in this example had a specific area of 15m$^2$/g, a powder density of 2.75g/cc and an oxygen content of 3.12% by weight of the starting powder.

To 1 gram of the silicon nitride powder there was added 0.03g $Mg_2Si$, i.e. 3 weight % of magnesium silicide powder which corresponds to 1.9 weight % of elemental magnesium based on the amount of silicon nitride, 10 cc of benzene with 0.02 gram of paraffin added as a binder. Mixing was carried out at room temperature for 15 minutes in a silicon carbide mortar and pestle in air.

After drying in a vacuum oven at 50° C and collection, resulting dry powder dispersion, which had an average particle size which was submicron, was loaded into a graphite die fitted with a 1 cm. diameter boron nitride insert. The faces of the graphite plungers were coated with a boride nitride slurry and dried before hot-pressing. The boron nitride material prevented reaction between the silicon nitride and graphite.

The thermal and pressure cycle for hot-pressing consisted of applying a pressure of 3.5 MPa(500 psi) at room temperature and a pressure of 55 MPa (~8000 psi) at 1100° C. There was a 1 minute hold at red heat (~800° C) to remove the paraffin binder. The time to reach 1750° C was about 15 minutes. After a soak time of 20 minutes at 1750° C in the nitrogen atmosphere under a pressure of 8000 psi, the power to the induction coils was turned-off, and the load removed. The boron nitride was removed by grinding it off the resulting hot-pressed body before characterization.

X-ray diffraction analysis of the hot-pressed body showed that the silicon nitride phase was composed of about 50% by weight β-silicon nitride phase and about 50% by weight α-silicon nitride phase; no other phases could be detected. However, observation of a polished section of the hot-pressed body by optical microscopy at high (500–1000X) magnifications showed the presence of unidentified discrete second phase particles usually less than 10 microns in size and in total amount less than 2% by volume of the body. One of the secondary phases had a high reflectivity and was probably elemental silicon; the other secondary phase is believed to be $MgSiN_2$. The residual pores were less than 5 microns in size and usually smaller than 2 microns. The β-silicon nitride grains were elongated and not longer than 5 microns, with an average grain size of about 2 microns and an average aspect ratio less than 4. The density of the hot-pressed body measured to be 3.18g/cc, or 100% of the theoretical value of 3.18g/cc. This run, i.e. the 3 wt.% $Mg_2Si$ run, which corresponds to 1.9 wt.% elemental magnesium, is shown in the accompanying figure.

In the accompanying figure all of the plotted runs were carried out in the same manner as the 3 wt.% $Mg_2Si$ run except for the amount of $Mg_2Si$ used. Specifically, the control run at 0% $Mg_2Si$ produced a product with a density of 57%, at 0.5 wt.% $Mg_2Si$ (0.3 wt.% elemental Mg) the product density was 74%, at 1 wt.% $Mg_2Si$ (0.6 wt.% elemental Mg) the product density was 87%, and at 2.0 wt.% $Mg_2Si$ (1.3 wt.% elemental Mg) the product density was 100%.

The hot-pressed product produced in those runs where the magnesium silicide ranged from 0.5 wt.% to 2.0 wt.%, showed substantially the same silicon nitride grain structure as was seen for the 3 wt.% $Mg_2Si$ run. However, the product produced in the 0.5 wt.% $Mg_2Si$ was found to be single phase by X-ray diffraction analysis and optical microscopy.

The shape of the curve in the accompanying figure will be in part determined by the mixing procedure used in that better mixing procedures will in general give higher densities for a given composition especially for magnesium silicide levels less than 1 weight % because it is difficult to disperse small amounts of the magnesium silicide with a mortar and pestle.

EXAMPLE 2

The in-house silicon nitride powder used in this example was amorphous to X-rays and had a specific surface area of $16m^2/g$. This powder was calcined in $N_2$ at 1450° C for 15 minutes to essentially crystallize all of the powder into $\alpha$-$Si_3N_4$. The oxygen content and specific surface area of this calcined powder was 2.06 wt.% and $10.0 m^2/g$, respectively.

40 g of this calcined, $\alpha$-$Si_3N_4$ powder was mixed at room temperature with 0.80 g of $Mg_2Si$, i.e. 2 wt.% $Mg_2Si$ powder, 25 cc of a solution of 1% paraffin in benzene, and 250 cc of benzene in a polyethylene jar mill containing 1/4 inch balls of $Si_3N_4$ grinding media. After mixing for 2 hours, the resulting dispersion was dried in a vacuum oven at 50° C for 1 day. The powder mixture, which was a significantly homogeneous dispersion with an average particle size that was submicron, was collected and placed in a 2 inch diameter graphite die which was previously coated with a boron nitride slurry and dried. The faces of the die plungers were also coated with a boron nitride slurry and dried.

The powder mixture was hot-pressed at 1800° C for 15 minutes in a nitrogen atmosphere at 10,000 psi. The density of the resulting hot-pressed body was 3.18g/cc, or ~ 100% of the theoretical value. This hot-pressed body was cut into a number of bars and evaluated.

X-ray diffraction analysis showed the sample was composed of $\beta$-$Si_3N_4$ plus a trace of $\alpha$-$Si_3N_4$.

Observation of a polished section by optical microscopy showed the microstructure contained a small amount of secondary phases of size smaller than 5 microns. Particles of a bright reflecting second phase were observed and believed to be elemental silicon, micron to submicron in size, and present in an amount less than about 1% by volume of the hot-pressed product. Particles of another secondary phase could be seen which is believed to be $MgSiN_2$ and present in an amount of less than about 2% by volume of the body.

The hot-pressed product had a Knoop hardness equal to 2250 kilograms per square millimeter for a load of 200 grams.

Its resistance to oxidation was measured in air at 1410° C for 21 hours and the resulting weight gain was 2.0 milligrams per $cm^2$.

Observation of the grains in the microstructure by chemical etching (8 minutes in boiling $NH_4F + HNO_3$ mixture) reveals that the $\beta$-$Si_3N_4$ grains are elongated and have an average length of about 2 microns and an aspect ratio of about 4. It was difficult to etch most of the grain boundaries indicating no obvious detection of a glassy phase.

The fracture strength of the hot-pressed product in the 3 point bending mode was determined. Its room temperature strength had an average value of 64,000 psi in air and at 1350° C in air it had an average value of 52,000 psi indicating a retention of about 80% of its room temperature strength value.

This indicates that at 1350° C the hot-pressed body of the present invention should maintain at least about 75% of its room temperature strength in air at 1350° C in air. In contrast, commercially available hot-pressed silicon nitride containing magnesium oxide as a densification aid usually retains only about 40% of its room temperature strength at 1350° C in air.

EXAMPLE 3

The calcined silicon nitride powder disclosed in Example 2 was also used in this example.

40 g of this calcined, $\alpha$-$Si_3N_4$ powder was mixed with 1.2g of $Mg_2Si$ powder and 0.8 g of free carbon of submicron size, 25 cc of a solution of 1% paraffin in benzene, and 250 cc of benzene in a polyethylene jar mill containing 1/4 inch balls of $Si_3N_4$ grinding media. This was equivalent to 3 wt.% $Mg_2Si$ and 2 wt.% free carbon based on the weight of silicon nitride. After mixing for 2 hours, the resulting dispersion was dried in a vacuum oven at 50° C for 1 day. The powder mixture, which was a significantly homogeneous dispersion with an average particle size that was submicron, was collected and placed in a 2 inch diameter graphite die which was previously coated with a boron nitride slurry and dried. The faces of the die plungers were also pre-coated with a boron nitride slurry and dried.

The powder mixture was hot-pressed at 1800° C for 20 minutes in a nitrogen atmosphere at 10,000 psi. The density of the hot-pressed sample was (3.19 g/cc) which is slightly higher than the theoretical value (3.18g/cc) of pure $Si_3N_4$, probably indicating the formation of SiC in the hot-pressed body.

X-ray diffraction analysis showed the sample was composed of $\beta$-$Si_3N_4$, plus a trace of $\alpha$-$Si_3N_4$. There was no detection of free C, SiC or any other possible secondary phases.

Observation of a polished section by optical microscopy showed the microstructure contained a small amount of secondary phases of a size smaller than 5 microns. Specifically, observation of the polished section by optical microscopy under reflected light shows the silicon nitride phase, i.e. the primary phase, as dark grey, and in contrast there is a mircon to submicron dispersion of a discrete lighter grey phase which is believed to be silicon carbide and which appears to be present in an amount less than about 4% by volume of the hot-pressed product. In addition, there appeared to be a few bright reflecting discrete particles of a phase which is believed to be elemental silicon and it appears to be present in a trace amount. In an occasional silicon carbide grain there is evidence of a small unreacted particle of elemental carbon and it is believed that such carbon can be eliminated with more uniform mixing.

Observation of the grains in the microstructure by chemical etching (8 minutes in boiling $NH_4F + HNO_3$ mixture) revealed that the $\beta$-$Si_3N_4$ grains are elongated and have an average length less than 2 microns.

All of the following cited applications are, by reference, made part of the disclosure of the present application and are assigned to the assignee hereof:

In copending U.S. patent application Ser. No. 756,084 entitled "Hot Pressing Of Silicon Nitride Using Beryllium Additive," filed of even date herewith in the names of Charles D. Greskovich, Svante Prochazka and Chester R. O'Clair, there is disclosed a dense polycrystalline silicon nitride body produced by hot-pressing a particulate mixture of silicon nitride and beryllium additive.

In copending U.S. patent application Ser. No. 756,085 entitled "Sintering Of Silicon Nitride Using Be Additive," filed of even date herewith in the names of Svante Prochazka, Charles D. Greskovich, Richard J. Charles and Robert A. Giddings, the disclosed process comprises forming a particulate dispersion of silicon nitride and beryllium additive into a green body and sintering it at a temperature ranging from about 1900° C to about 2200° C in a sintering atmosphere of nitrogen at superatmospheric pressure producing a sintered body with a density ranging from about 80% to about 100%.

In copending U.S. patent application Ser. No. 756,086 entitled "Sintering Of Silicon Nitride Using Mg And Be Additives," filed of even date herewith in the names of Svante Prochazka, Charles D. Greskovich, Richard J. Charles and Robert A. Giddings, the disclosed process comprises forming a particulate dispersion of silicon nitride, magnesium additive and beryllium additive into a green body and sintering the green body at a temperature ranging from about 1800° to about 2200° C in a sintering atmosphere of nitrogen at superatmospheric pressure producing a sintered body with a density ranging from about 80% to about 100%.

What is claimed is:

1. A method of producing a hot-pressed polycrystalline silicon nitride body having a density of at least 80% of the theoretical density of silicon nitride and which retains at least about 75% of its room temperature mechanical properties at elevated temperatures ranging up to at least 1350° C in air which consists essentially of providing at least a significantly homogeneous powder dispersion having an average particle size which is submicron of silicon nitride and magnesium silicide, and based on the total composition of the starting silicon nitride powder said silicon nitride powder containing up to about 0.1% by weight of metallic impurities which react with $SiO_2$ or Si and $O_2$ to form low melting intergranular silicate glassy phase, up to about 3% by weight of oxygen, up to about 4% by weight of elemental silicon, and up to about 1% by weight of halogen, said magnesium silicide being used in an amount ranging from about 0.5% by weight to about 3% by weight based on the amount of silicon nitride, and hot-pressing said dispersion in an atmosphere of nitrogen at a temperature ranging from about 1600° C to about 1850° C under a pressure of at least about 2000 psi, said body being at least substantially free of an intergranular silicate glassy phase at its grain boundaries.

2. A method according to claim 1 wherein said nitrogen atmosphere ranges from atmospheric pressure to superatmospheric pressure of about 5 atmospheres.

3. A method according to claim 1 wherein said temperature ranges from about 1700° to about 1800° C and said pressure ranges from about 4000 psi to about 8000 psi.

4. A method according to claim 1 wherein said magnesium silicide is used in an amount of about 2% by weight.

* * * * *